United States Patent
Mori

(10) Patent No.: US 6,524,213 B2
(45) Date of Patent: Feb. 25, 2003

(54) TOROIDAL CONTINUOUSLY VARIABLE TRANSMISSION

(75) Inventor: Haruhito Mori, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 27 days.

(21) Appl. No.: 09/821,088

(22) Filed: Mar. 30, 2001

(65) Prior Publication Data

US 2001/0027145 A1 Oct. 4, 2001

(30) Foreign Application Priority Data

Apr. 3, 2000 (JP) ..................................... 2000-100668

(51) Int. Cl.$^7$ ............................................... F16H 57/04
(52) U.S. Cl. ............................... 476/8; 476/46; 476/42; 476/40
(58) Field of Search ................................ 476/8, 46, 42, 476/40

(56) References Cited

U.S. PATENT DOCUMENTS

| | | | |
|---|---|---|---|
| 4,126,052 A | | 11/1978 | Jackman |
| 4,464,946 A | | 8/1984 | Kraus |
| 4,694,704 A | | 9/1987 | Kraus |
| 4,718,294 A | | 1/1988 | Okoshi |
| 5,536,091 A | * | 7/1996 | Takata et al. ............... 384/609 |
| 5,720,689 A | * | 2/1998 | Imanishi et al. ............ 384/455 |
| 5,830,103 A | * | 11/1998 | Itoh et al. .................... 476/40 |
| 6,030,309 A | * | 2/2000 | Nakano ....................... 476/10 |
| 6,080,079 A | * | 6/2000 | Sakai ........................... 476/10 |
| 6,132,331 A | * | 10/2000 | Imanishi et al. ............. 476/10 |
| 6,174,257 B1 | * | 1/2001 | Imanishi et al. ............. 476/40 |
| 6,196,945 B1 | * | 3/2001 | Mori et al. ................... 476/10 |
| 6,203,467 B1 | * | 3/2001 | Yamamoto et al. .......... 476/42 |
| 6,238,318 B1 | * | 5/2001 | Itoh et al. .................... 476/42 |
| 6,261,203 B1 | * | 7/2001 | Shimizuya et al. ...... 29/898.13 |
| 6,328,669 B1 | * | 12/2001 | Imanishi et al. ............. 476/40 |

FOREIGN PATENT DOCUMENTS

| JP | 7-229549 | 8/1995 |
|---|---|---|

OTHER PUBLICATIONS

Patent Abstracts of Japan, vol. 2000, No. 02, Feb. 29, 2000, Patent Publication No. 11325211, Published Nov. 26, 1999.

* cited by examiner

*Primary Examiner*—Christopher P. Schwartz
*Assistant Examiner*—Devon Kramer
(74) *Attorney, Agent, or Firm*—Foley & Lardner

(57) ABSTRACT

Power rollers 18c are comprised by an inner roller 93 making frictional contact between the input and output disks 18a, 20a and an outer roller 94 supporting a contact load input from the input and output disks 18a, 20a to the inner roller 93 through a ball bearing 92. An inner radial hole 93a is provided on the inner roller 93 to support a pivot shaft 15. The inner radial hole 93a opens near the outer roller and is covered by a bottom part 93b on a side opposite to the outer roller. In this manner, compression deformation of the inner roller is suppressed when a load is applied to the inner roller. Thus smooth rotational motion of the power roller is maintained and component durability can be increased.

5 Claims, 5 Drawing Sheets

TOROIDAL CONTINUOUSLY VARIABLE TRANSMISSION

TECHNICAL FIELD OF THE INVENTION

This invention relates to a toroidal continuously variable transmission for a vehicle, in particular relates to improvements in a power roller sandwiched between an input disk and an output disk.

BACKGROUND OF THE INVENTION

The power roller of a toroidal continuously variable transmission is sandwiched between an input disk and an output disk so as to transmit the rotations of the input disk to the output disk. The structure of such a power roller is disclosed in JP-A-7-229549 published by the Japanese Patent Office in 1995.

The power roller comprises an inner roller which makes contact with the input and output disks and an outer roller which supports a load applied on the inner roller through a ball bearing. A through hole is provided on the central axis of the inner roller to allow insertion of pivot shaft of a trunnion. Therefore the problem has arisen that when a large load is applied by the input and output disks, the inner roller displays a tendency to undergo compression deformation inwardly.

This deformation results in a deterioration in component durability and hinders the smooth transmission of a rotation torque by the power roller.

SUMMARY OF THE INVENTION

The present invention is proposed to solve the above problem and has the object of avoiding deformation of the inner roller of the power roller and maintaining smooth rotational motion.

A further object of this invention is to increase the durability of the power roller.

In order to achieve the above objects, the invention provides a toroidal continuously variable transmission which comprises an input disk and an output disk disposed co-axially in an opposed orientation, a power roller which is sandwiched in order to transmit drive force between the input and output disks, and a trunnion which supports the power roller to rotate freely on a pivot shaft. The power roller comprises an inner roller making frictional contact between the input and output disks and an outer roller supporting a contact load input from the input and output disks to the inner roller through a ball bearing, and an inner radial hole to support a pivot shaft is formed on a rotational center of the inner roller, the inner radial hole being formed as a recessed hole that opens toward the outer roller and a bottom part of the inner radial hole is substantially closed on a side that faces the input and output disks.

The details as well as other features and advantages of the invention are set forth in the remainder of the specification and are shown in the accompanying drawings.

DESCRIPTION OF THE PREFERD EMBODIMENTS

Figure 1:
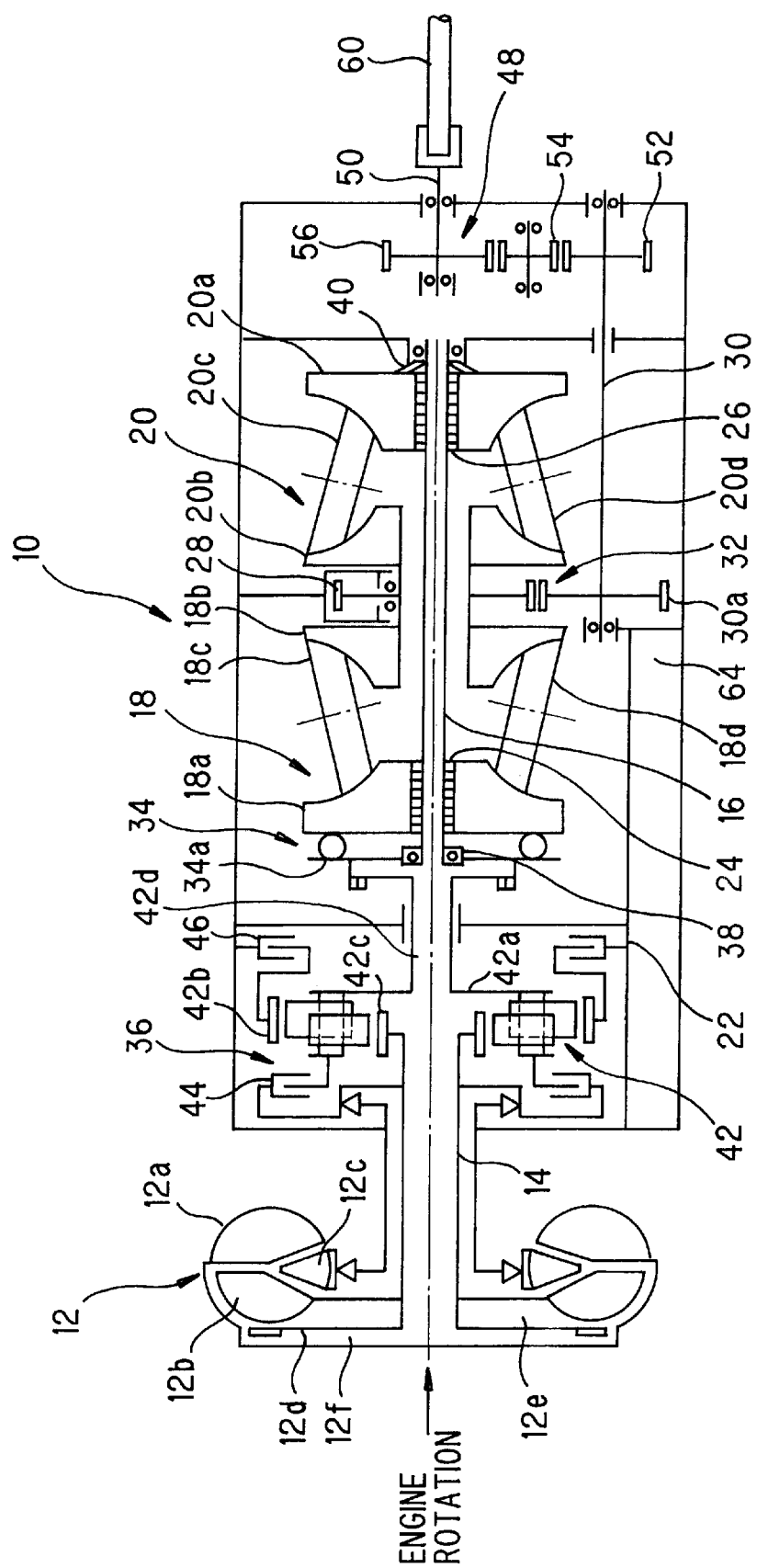
FIG. 1 is a schematic view of the overall structure of the toroidal continuously variable transmission of this invention.

FIG. 1 is a schematic view of the overall structure of a toroidal continuously variable transmission.

A rotational drive force from an engine (not shown) is input through a torque converter 12 to the toroidal continuously variable transmission 10. The torque converter 12 comprises a pump impeller 12a, a turbine runner 12b, a stator 12c, a lock-up clutch 12d, an applying oil chamber 12e and a releasing oil chamber 12f.

An impeller shaft 14 pierces a central part of the torque converter 12 and the rotations of the turbine runner 12b are transmitted to the impeller shaft 14.

The impeller shaft 14 is connected to a forward/reverse switching mechanism 36. The forward/reverse switching mechanism 36 selectively switches the rotational direction of engine rotations which are transmitted to the continuously variable transmission 10.

For this purpose, the forward/reverse switching mechanism 36 is provided with a planetary gear mechanism 42, a forward clutch 44 and a reverse clutch 46. The planetary gear mechanism 36 comprises a pinion carrier 42a which supports pinions, a ring gear 42b which meshes with respective pinions and is disposed on an outer side of the pinions and a sun gear 42c which is disposed on an inner side of the pinions.

A rotation shaft 42d which is connected to the pinion carrier 42a of the planetary gear mechanism 42 acts as the output shaft of the forward/reverse switching mechanism 36 and is disposed coaxially to a torque transmission shaft 16 of the continuously variable transmission 10. A first continuously variable mechanism 18 and a second continuously variable mechanism 20 are disposed in tandem on the torque transmission shaft 16 inside the transmission case 22.

The first continuously variable mechanism 18 comprises an input disk 18a and output disk 18b which have opposed toroidal faces and a pair of power rollers 18c, 18d which are sandwiched between the opposed faces of the input and output disks 18a, 18b.

The power rollers 18c, 18d are supported to enable varying an angle of gyration due to support by a support member termed a trunnion which is described hereafter. The rotation speed transmitted to the output disk 18b from the input disk 18a is varied in response to the gyration angle.

The second continuously variable mechanism 20 has a similar structure to the first continuously variable mechanism 18 and is provided with an input disk 20a, an output disk 20b and a pair of power rollers 20c, 20d sandwiched by the input and output disks 20a, 20b.

The power rollers 18c, 18d and power rollers 20c, 20d are adapted to vary an angle of gyration synchronously by the displacement of the trunnions.

The output disks 18b, 20b of both continuously variable mechanisms 18, 20 are supported to rotate freely coaxial to the torque transmission shaft 16. The output disks 18b, 20b are disposed to be mutually adjacent and opposed. Moreover the output disks 18b, 20b rotate together by being interconnected.

In contrast, the input disks 18a, 20a are separated in opposed directions and are supported on the torque transmission shaft 16 through ball splines 24, 26. As a result, although the input disks 18a, 20a rotate together with the torque transmission shaft 16, they are capable of displacing in an axial direction.

One input disk 18a is pressed from its rear face in an axial direction towards the right in the drawing by a loading cam device 34 which generates a pressing force which is input through the torque converter 12 in response to an input torque, according to this, power rollers 18c, 20c are gripped strongly between the input disks 18a, 20a and output disks 18b, 20b so that the power rollers do not slip even when the large torque is input between the input disks and the output disks.

The other input disk 20a is pressed by a plate spring 40 to generate pre-load on the power rollers 18c, 20c to prevent a slip during no load.

The loading cam device 34 has a loading cam 34a and is supported to rotate freely on a torque transmission shaft 16 through a slide bearing 38.

The loading cam 34a of the loading cam device 34 which rotates together with the rotation shaft 42d presses the rear face of the input disk 18a and synchronizes the rotation of the input disk 18a. That rotation is transmitted to the opposite input disk 20a through a torque transmission shaft 16. In this manner, the input disks 18a, 20a of the first and second continuously variable mechanisms 18, 20 rotate in synchronization and the rotation is transmitted to the output disks 18b, 20b through the power rollers.

The output disks 18b, 20b are spline jointed to an output gear 28 which is supported to rotate relative to and coaxial to the torque transmission shaft 16. The rotations of the output disks 18b, 20b are transmitted to a gear 30a which is connected to a counter shaft 30 through an output gear 28. These gears 28, 30a comprise a first rotation transmission mechanism 32. Furthermore a gear 52 provided on the counter shaft 30 and a gear 56 provided on transmission output shaft 50 meshes via an idle gear 54 and thus comprise a second rotation transmission mechanism 48. The output shaft 50 transmits these rotations to the vehicle propeller shaft 60.

Figure 2:
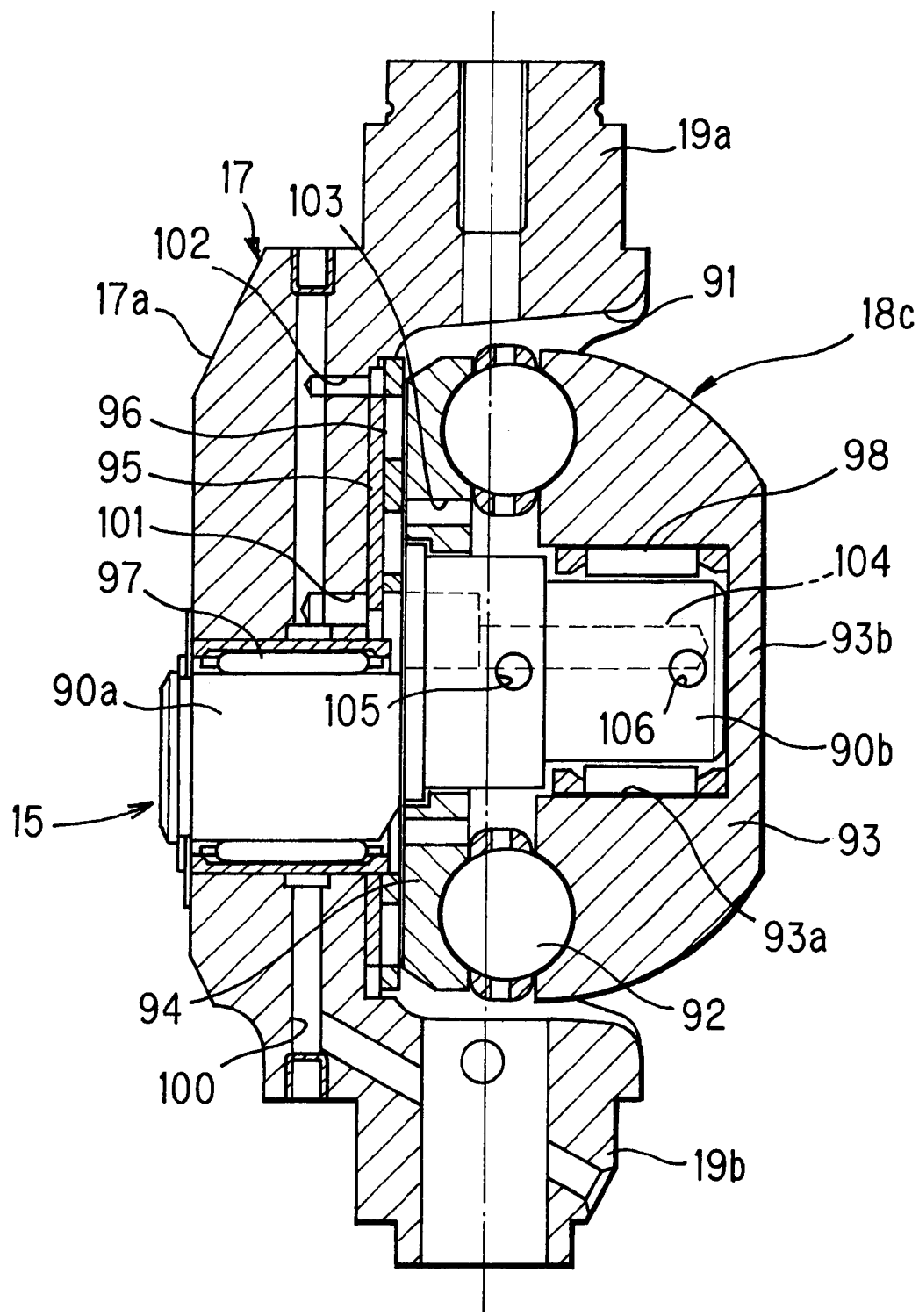
FIG. 2 is a cross sectional view of a power roller according to an embodiment this invention.

The power roller 18c is taken to be representative of the power rollers 18c, 18d, 20c, 20d and is described on the basis of FIG. 2. The other power rollers 18d, 20c, 20d have the same structure.

Shafts 19a, 19b are provided on the top and bottom of a trunnion 17 which functions as a support member for the power roller 18c and a support part 17a is formed eccentrically to the shafts 19a, 19b. A power roller storage portion 91 is formed on the support member 17a. The power roller 18c is supported to rotate through a pivot shaft 15 in the power roller storage portion 91. The pivot shaft 15 is provided on the support part 17a of the trunnion 17 at right angles to the shafts 19a, 19b.

When the trunnion 17 is displaced vertically by a hydraulic cylinder (not shown), a gyration force is generated at the contact point between the power roller 18c and input and output disks 18c, 18d according to the deviation of the center axis of the input and output disks 18c, 18d and the pivot shaft 15, so that the angle of gyration of the power roller 18c is varied by a fluctuating motion of the trunnion 17 about the shaft 19a, 19b. Thus the transmitted rotation speed from the input disk 18a to the output disk 18b is varied.

The power roller 18c comprises an inner roller 93 making frictional contact with the input and output disks 18a, 18b and an outer roller 94 which supports a thrust force applied to the inner roller 94 through a ball bearing 92. A support plate 95 is fixed to a flat part of the power roller storage portion 91 on a rear face of the outer roller 94. A thrust bearing 96 is interposed between the support plate 95 and the outer roller 94.

Figure 5:
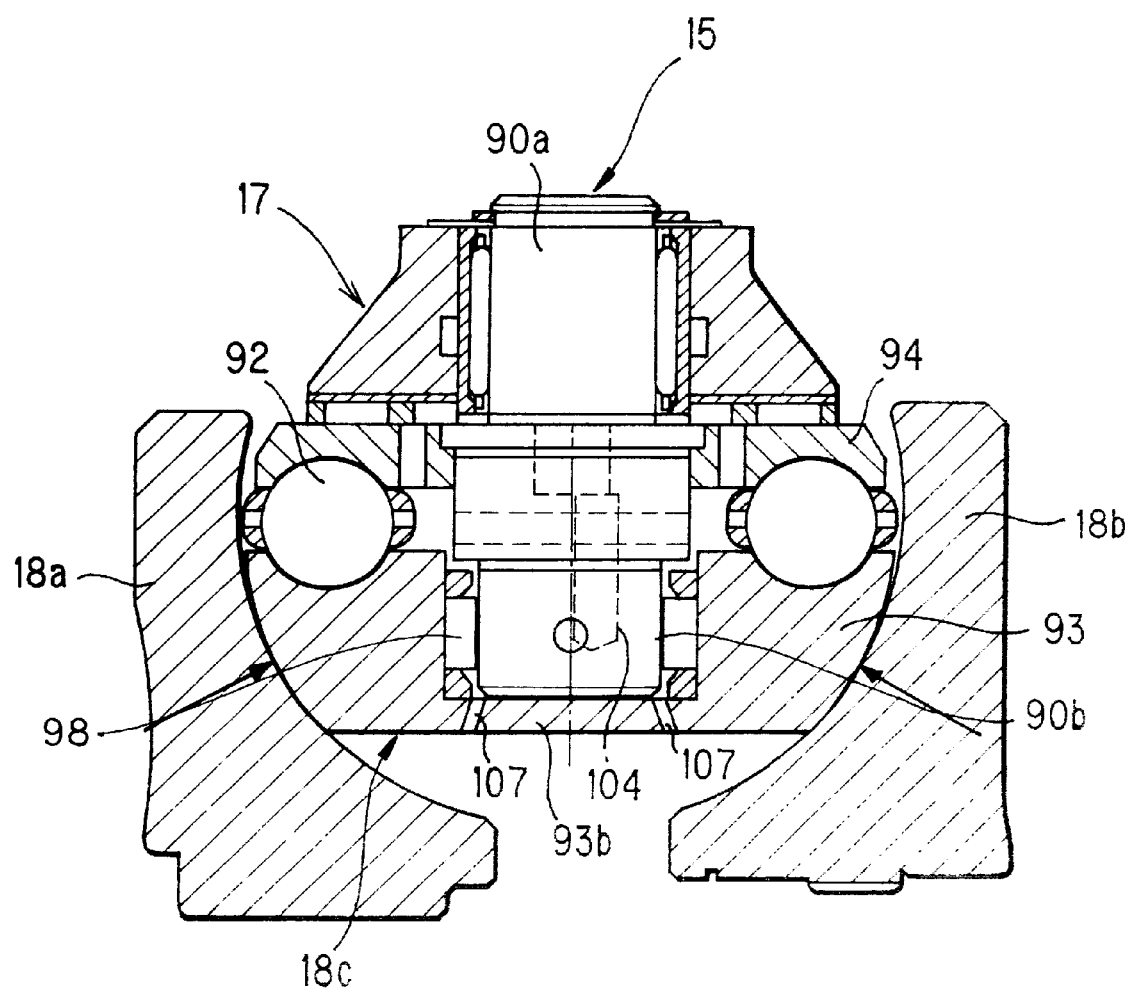
FIG. 5 is a cross sectional view of a power roller according to yet another embodiment of this invention.

An inclined sandwiching load is applied in a direction shown by the arrow in FIG. 5 as for reference to the inner roller which is gripped by the input and output disks 18a, 18b, a thrust force as a component of the load is supported by the outer roller 94 through a ball bearing. At the same time, the thrust force is transmitted from the outer roller 94 to the support part 17a through a thrust bearing 96, and this thrust load is supported by the trunnion 17.

An inner radial hole 93a is formed in a central part of the inner roller 93 in order to allow insertion of a section of the pivot shaft 15. The inner radial hole 93a has an opening faced to the outer roller 94, however the bottom part 93b of the hole is covered, the inner radial hole 93a takes the form of a recessed hole. This structure creates high rigidity and mechanical strength in the inner roller 93 since the side supporting a large sandwiching load from the input and output disks 18a, 18b is connected by the bottom part 93b.

Since the inner radial hole 93a allows insertion a part of the pivot shaft 15, the provision of a recessed hole prevents inward deformation of the inner roller even with respect to loads which would not be supported by a through hole as employed in the prior art.

The pivot shaft 15 comprises a trunnion shaft portion 90a and a power roller shaft portion 90b disposed eccentrically to the trunnion shaft portion 90a. The pivot shaft 15 is supported by a first roller bearing 97 at the trunnion shaft portion 90a to rotate with respect to the trunnion 17a. The inner roller 93 is supported free to rotate to the power roller shaft portion 90b through a second roller bearing 98 and outer roller 94 is also supported to the power roller shaft portion 90b.

Lubrication of the bearing will be described below.

A first lubrication oil passage 100 is formed in the trunnion 17 to introduce lubrication oil supplied by an oil pressure unit (not shown). Two branching oil passages 101, 102 are formed in order to supply a lubrication oil to the thrust bearing 96 from the first lubrication oil passage 100. A second lubrication oil passage 103 is formed on the outer roller 94 to supply further lubrication oil in the thrust bearing 96 to the ball bearing 92.

A lubrication oil passage 104 is formed in the power roller shaft portion 90b of the pivot shaft 15 to introduce lubrication oil from the thrust bearing 96 through the branching oil passage 101 in an axial direction. Radial lubrication oil passages 105, 106 are formed which branch at right angles from the lubrication oil passage 104 and which supply lubrication oil respectively to the ball bearing 92 and the roller bearing 98.

The effect of the invention will be described below.

A large load is applied to the inner roller 93 in response to drive force transmitted between the inner roller 93 and the input and output disks 18a, 18b. This load tends to create an inward deformation in the inner roller 93. However the inner radial hole 93a provided in an inner part of the inner roller 93 is covered by a bottom part 93b on the side to which the load is applied from the input and output disks 18a, 18b, therefore it is possible to increase component durability and to prevent deformation.

As a result, since the inner roller 93 does not deform, the power roller 18c normally realizes smooth transmission of rotations while sandwiched between the input disk 18a and the output disk 18c.

The inner rollers of the other power rollers 18*d*, 20*c*, 20*d* show the same effect.

The inner radial hole 93*a* of the inner roller 93 is covered by a bottom part 93*b* and lubrication oil is effectively supplied to the second roller bearing 98 or the ball bearing 92 through the radial lubrication oil passage 105, 106 and the lubrication oil passage 104 of the pivot shaft 15 from the branching oil passage 101 and the first lubrication oil passage 100 of the trunnion 17. This arrangement allows for sufficient lubrication of the bearing of the inner roller 93 and it is possible to maintain smooth rotational motion. This increases durability of the bearings 92, 98 and the power roller 18*c*.

The other power rollers 18*d*, 20*c*, 20*d* show the same effect.

During manufacture of prior art devices, a washer or a snap ring is provided on parts in which the pivot shaft projects from the tip of the inner roller in order to prevent detachment of the inner roller. However since the inner radial hole 93*a* of the inner roller 93 has a bottom part 93*b* in this invention, it is possible to omit the snap ring or washer which thus reduces the number of components and also reduces processing steps as a snap ring groove need not be provided.

Another embodiment of this invention will be described below.

Figure 3:
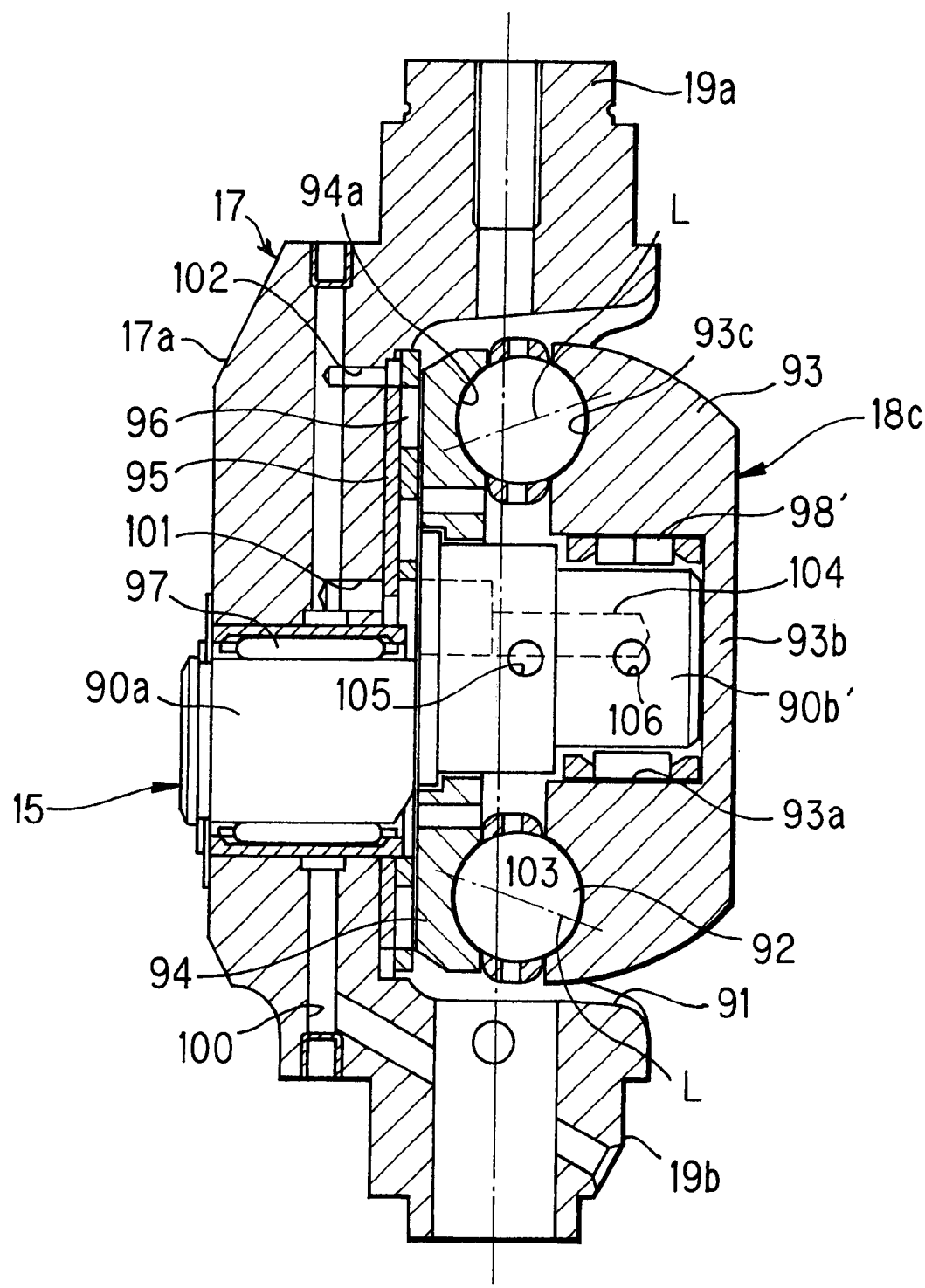
FIG. 3 is a cross sectional view of a power roller according to another embodiment of this invention.

In the embodiment as shown in FIG. 3, the ball bearing 92 is set so that the position of contact with the inner roller 93 and outer roller 94 differs in a radial direction about the rotational center of the power roller 18*c*.

A line L of application of the load on the ball bearing 92 is set to incline with respect to the rotational center of the power roller 18*c* so that the point of contact between the orbit 93*c* of the inner roller 93 and the ball bearing 92 diverges from the rotational center of the power roller 18*c* and the point of contact of the orbit 94*a* of the outer roller 94 and the ball bearing 92 converges towards the central axis of the power roller 18*c*.

As a result, since a radial load applied on the inner roller 93 is supported by the ball bearing 92 provided at an inclined contact angle, the inner roller 93 does not tend to displace in a radial direction which thus increases the supporting rigidity of that component.

The inner radial hole 93*a* provided in an inner part of the inner roller 93 is also covered by a bottom part 93*b* on the side to which the load is applied from the input and output disks 18*a*, 18*b*, therefore it is possible to increase component durability and to prevent deformation.

Figure 4:
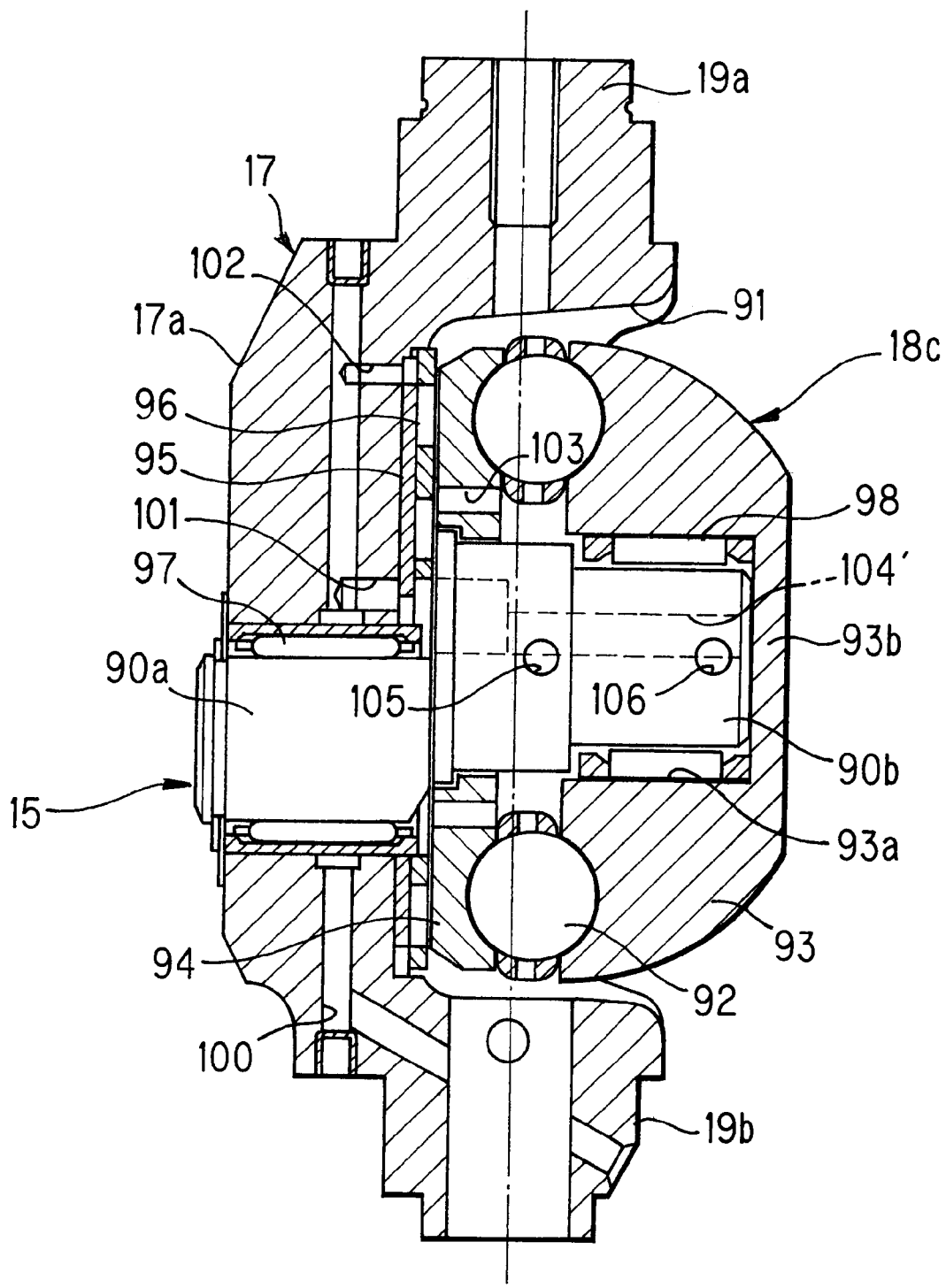
FIG. 4 is a cross sectional view of a power roller according to yet another embodiment of this invention.

A further embodiment of this invention will be described below with reference to FIG. 4.

This embodiment differs from the second embodiment in that a lubrication oil passage 104 which is provided on the power roller shaft portion 90*b* is pierced in an axial direction in order to supply lubrication oil to the second roller bearing 98 disposed between the inner roller 93 and the pivot shaft 15.

That is to say, the pierced lubrication oil passage is designated by the reference numeral 104'. Lubrication oil from the lubrication oil passage 104' of the power roller shaft portion 90*b* reaches the bottom part 93*b* of the inner radial hole 93*a* and it is possible to supply sufficient lubrication oil to the second roller bearing 98.

Yet another embodiment of the invention will be described below.

As shown in FIG. 5, lubrication holes 107 which supply lubrication oil to the moving faces of the input and output disks 18*a*, 18*b* are provided at two positions on the bottom part 93*b* of the inner roller 93.

The lubrication oil which is introduced to the inner radial hole 93*a* through the lubrication oil passage 104 of the inner part of the pivot shaft 15 is discharged outwardly from the lubrication oil holes 107 and is supplied to the moving faces of the input and output disks 18*a*, 18*b*.

In this manner, lubrication of the moving faces of the input and output disks 18*a*, 18*b* which make contact with the power roller 18*c* is effectively performed and thus it is possible to improve the durability of the moving faces of the input and output disks with respect to fatigue.

In this case, the lubrication oil passage 104 formed in the power roller shaft 90*b* may be provided as a pierced lubrication oil passage 104'.

The entire content of Japanese Patent Application P2000-100668 (filed Apr. 3, 2000) is incorporated herein by reference.

This invention is not limited to the above embodiments and various changes and modifications may be made in the invention without departing from the spirit and scope thereof.

What is claimed is:

1. A toroidal continuously variable transmission comprising:

an input disk and an output disk disposed co-axially in an opposed orientation;

a power roller which is sandwiched in order to transmit drive force between the input and output disks; and a trunnion which supports the power roller rotatively on a pivot shaft;

wherein the power roller comprises an inner roller making frictional contact between the input and output disks and an outer roller supporting a contact load input from the input and output disks to the inner roller through a ball bearing, and an inner radial hole to support the pivot shaft is formed on a rotational center of the inner roller, the inner radial hole being formed as a recessed hole that opens toward the outer roller and a bottom part of the inner radial hole is substantially closed on a side that faces the input and output disks.

2. The toroidal continuously variable transmission as defined in claim 1, wherein a point of contact between an orbit of the inner roller and the ball bearing diverges from the rotational center of the power roller and a point of contact between an orbit of the outer roller and the ball bearing converges towards the central axis of the power roller, a line of application of a load with respect to a ball bearing is inclined with respect to a rotational center of the power roller.

3. The toroidal continuously variable transmission as defined in claim 1, wherein a roller bearing is provided between the inner radial hole of the inner roller and the pivot shaft, and lubricating oil is supplied to the roller bearing from a lubrication oil passage pierced in the axial direction on an inner part of the pivot shaft.

4. The toroidal continuously variable transmission as defined in claim 3, wherein a lubrication hole piercing the bottom part of the inner radial hole is provided, and lubricating oil is supplied to the respective moving faces of the input and output disks from the lubrication hole.

5. The toroidal continuously variable transmission as defined in claim 1, wherein the bottom part is formed integral with the inner roller.

\* \* \* \* \*